United States Patent [19]

Heber et al.

[11] Patent Number: 5,939,001
[45] Date of Patent: *Aug. 17, 1999

[54] PROCESS FOR MANUFACTURING OBJECTS FROM FIBER-REINFORCED THERMOPLASTS

[75] Inventors: Michael Heber; Reinhard Kreitlow, both of Grefrath; Leo Rosenkranz, Krefeld; Markus Ingendae, Grefrath; Gunter Nebelung, Kerken; Rudolf Kleinholz, Wurselen, all of Germany

[73] Assignee: Becker Group Europe GmbH, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/777,288

[22] Filed: Dec. 27, 1996

[30] Foreign Application Priority Data

Dec. 27, 1995 [DE] Germany .................... 195 48 854

[51] Int. Cl.$^6$ ................ B29B 7/42; B29B 7/90; B29C 47/10
[52] U.S. Cl. ............. 264/211; 264/122; 264/211.21; 264/349
[58] Field of Search ................ 264/122, 349, 264/211, 211.21, 328.17, 328.18, 914, 913, 920

[56] References Cited

U.S. PATENT DOCUMENTS

| | | | |
|---|---|---|---|
| 3,655,850 | 4/1972 | Woodham et al. | 264/122 |
| 4,616,989 | 10/1986 | Mewes et al. | 264/349 |
| 5,082,605 | 1/1992 | Brooks et al. | 264/122 |
| 5,185,117 | 2/1993 | Hawley | 264/349 |
| 5,269,991 | 12/1993 | Gueret | 264/122 |
| 5,358,680 | 10/1994 | Boissonnat et al. | 264/328.18 |
| 5,417,904 | 5/1995 | Razi et al. | 264/349 |
| 5,424,020 | 6/1995 | Hara et al. | 264/328.18 |
| 5,538,784 | 7/1996 | Subramanian | 264/122 |
| 5,591,384 | 1/1997 | Abrams et al. | 264/913 |
| 5,595,696 | 1/1997 | Schlarb et al. | 264/328.18 |

OTHER PUBLICATIONS

Von Manfred Weber, "Kunststoffberater" Mar. 1983, pp. 19–22.

"Kunststoff–Berater" Feb. 1974, pp. 80–82.

Textbook, Ingenieurwissen, Dosieren in der Kunstsofftechnik, VDI–Verlag GmbH, Düsseldorf 1978, pp. 26–27, 70–71 and 76–77.

*Primary Examiner*—Mathieu D. Vargot
*Attorney, Agent, or Firm*—Harness, Dickey & Pierce, P.L.C.

[57] ABSTRACT

The invention pertains to processes for manufacturing objects and in particular moulded components from fiber-reinforced thermoplastic resins. The process involves blending a thermoplastic resin with reinforcing fibers, plasticating the blend with the addition of heat inside a screw-type extruder and extruding a plasticated mass for moulding. The thermoplastic resin is fed to the screw-type extruder in powder form and in a blend with the reinforcing fibers.

9 Claims, No Drawings

PROCESS FOR MANUFACTURING OBJECTS FROM FIBER-REINFORCED THERMOPLASTS

BACKGROUND OF THE INVENTION

The invention pertains to a process for manufacturing objects and in particular moulded components from fiber-reinforced thermoplastic materials by blending a thermoplastic resin with reinforcing fibers, plasticating the blend inside a screw-type extruder with the addition of heat, and extruding a plastic mass for moulding.

A process of this class is generally known. In this known process, a thermoplastic resin in granulate form, with particle size greater than 2 mm is mixed with reinforcing fibers and blended in a screw-type extruder. The resulting mass is kneaded and plasticated with the addition of heat from the exterior of the extruder. It is difficult to introduce the entire quantity of heat required to plasticate the thermoplastic resin from the exterior of the screwtype extruder since the walls of the extruder housing would become too hot. In this scenario, the low-viscosity thermoplastic material would collect along the inside surface of the extruder, adversely affecting the consistency of the material. Due to the poor heat conductivity of plastics, plastication solely by externally introduced heat to the interior of the extruder would also increase the time to plasticate the blend.

Consequently a combined heat generation technique is practiced. This technique involves a two step process. First, heat is introduced through the walls of the extruder housing into the interior of the extruder and to the thermoplastic resin mass located therein. Secondly, the action of the screw resulting from its rotation in the extruder housing introduces friction energy to the thermoplastic mass moved by the screw. The kinetic energy applied by the rotating screw to the mass is converted into thermal energy which can be used for additional heating of the blend. If the screw applies too much power to the blend, the reinforcing fibers blended with the thermoplastic will break and be shortened. The strength of the resulting product will therefore suffer.

In order to avoid this detrimental damage to the fibers, an intermediate step in semi-finished product manufacturing is practiced. Thus, for example, glass mats are manufactured and impregnated with a thermoplastic matrix or glass fibers are coated in an extrusion process with thermoplastic melt and the mass is subsequently granulated.

In such a process, it is possible to produce moulded parts with reinforcing fibers which are well maintained and well embedded but the additional effort required for manufacture of the intermediate product is considerable.

Thus, the object of the present invention is to indicate a process for manufacturing objects from fiber-reinforced thermoplastic resins in the known class, in accordance with which the parts moulded from long-fiber-reinforced thermoplastic resins can be manufactured more simply.

To attain this object, it is proposed that in the generic process the thermoplastic resin be in powder form, be blended with the reinforcing fibers and fed to the screw-type extruder. It is preferable that the thermoplastic powder be fed to the screw-type extruder at a mean particle size of less than 1 mm and more preferably less than 0.5 mm.

The object is achieved with the measures in accordance with the invention. As a result of the fineness of the thermoplastic materials mixed with the reinforcing fibers and fed to the screw-type extruder, the plastication of the blend is achieved at lower levels of power being applied by the effect of the rotating screw on the thermoplastic blend located in the extruder, i.e. with less friction energy. The result is that the long reinforcing fibers in the resulting plasticated mass generally retain their length. Consequently, their reinforcing effect is generally unaffected.

Due to the small grain size of the thermoplastic resin powder, early distribution with the reinforcing fibers is achieved so that a larger contact surface area is available between the fibers and the matrix from the very start of the heating process. In this way, improved fiber wetting with gentle heating is achieved from the commencement of the process. In addition, a large amount of friction energy is not required. Consequently, the fibers experience minimal damage. The parts thus manufactured achieve considerably better mechanical properties, and in particular demonstrate a generally high impact resistance.

Glass fibers are most frequently used as the reinforcing fibers. Alternatively, other reinforcing fibers such as natural fibers, e.g. flax, mineral-based fibers or even synthetic fibers are used. Fibers can be fed to the screw-type extruder pre-blended with the thermoplastic powder. Alternatively, a metered feed of the components can be effected separately wherein blending takes place inside the extruder.

In a preferred embodiment, the thermoplastic powder is a non-compounded raw polymer which is already obtained in the polymerization process at the appropriate fine grain size. Additives such as stabilizers, flame suppressants, and the like can be added in granulate or powder form, to a quantity of about 10 per cent by mass.

The invention is elucidated in greater detail using the following example.

EXAMPLE

In a screw-type extruder unit, a mixture comprising 67% by weight of polypropylene (PP) powder with grain size of about 200 $\mu$m, 30% by weight of glass fibers (12 mm long, 17$\mu$m diameter) along with two master batches (granulate size about 2.5 mm) in each case 1 and 2 per cent by weight for thermal stabilization and for coupling the fibers to the PP, respectively, are metered through a hopper.

Operating at low back pressure, the material is plasticated inside the extruder and discharged as a metered shot. The shot is then transferred to a compression mould where it is worked to form a moulded part by way of compression moulding.

We claim:

1. A process for manufacturing molded parts comprising the steps of: metering a thermoplastic resin in powder form and long reinforcing fibers to a screw extruder without external pre-mixing, wherein the thermoplastic resin powder exhibits a mean particle size less than 1 mm and the ratio of the length of the long fibers to the mean particle size of the resin is greater than about 12 to 1;

mixing, kneading and plasticating the blend with the addition of heat inside the screw extruder, wherein the reinforcing fibers are mixed with the thermoplastic resin powder from the beginning of the heating; and extruding a plasticated mass for molding.

2. The process in accordance with claim 1, wherein the thermoplastic resin powder being fed to the screw extruder exhibits a mean particle size of less than 0.5 mm.

3. The process in accordance with claim 1, wherein the reinforcing fibers are cut glass fibers.

4. The process in accordance with claim 1, wherein the reinforcing fibers are cut natural fibers.

5. The process in accordance with claim 1, wherein the reinforcing fibers are synthetic fibers.

6. The process in accordance with claim 1, further comprising the steps of utilizing a non-compounded raw polymer as the powder and complementing it with additives at up to 10 per cent by mass.

7. The process in accordance with claim 6, wherein the additives comprise stabilizers, flame suppressants, or combinations thereof.

8. The process in accordance with claim 1, wherein the thermoplastic resin is polypropylene.

9. The process in accordance with claim 1, wherein the long reinforcing fibers are about 12 mm long.

* * * * *